(12) United States Patent
Joseph et al.

(10) Patent No.: US 9,071,882 B2
(45) Date of Patent: Jun. 30, 2015

(54) USER-CONFIGURABLE VIDEO DATA SERVICE AND INTERFACE

(75) Inventors: Kurt M. Joseph, Austin, TX (US); Thad Pasquale, Austin, TX (US); Marc Sullivan, Austin, TX (US); Philip Kortum, Houston, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1607 days.

(21) Appl. No.: 11/346,068

(22) Filed: Feb. 2, 2006

(65) Prior Publication Data

US 2007/0180489 A1 Aug. 2, 2007

(51) Int. Cl.
| | |
|---|---|
| H04N 21/858 | (2011.01) |
| H04N 21/435 | (2011.01) |
| H04L 29/06 | (2006.01) |
| H04N 21/6405 | (2011.01) |
| H04N 21/2347 | (2011.01) |
| H04N 21/44 | (2011.01) |
| H04N 21/643 | (2011.01) |
| H04N 21/81 | (2011.01) |
| H04N 21/845 | (2011.01) |

(52) U.S. Cl.
CPC .......... *H04N 21/6405* (2013.01); *H04N 21/858* (2013.01); *H04N 21/435* (2013.01); *H04L 69/16* (2013.01); *H04N 21/23476* (2013.01); *H04N 21/44016* (2013.01); *H04N 21/64322* (2013.01); *H04N 21/812* (2013.01); *H04N 21/8455* (2013.01)

(58) Field of Classification Search
CPC .... H04L 69/16; H04N 21/235; H04N 21/435; H04N 21/858; H04N 21/2542
USPC ........... 725/112, 37–40, 43, 50, 51, 105, 109, 725/111, 113, 60, 135, 136; 33/112
See application file for complete search history.

(56) References Cited

U.S. PATENT DOCUMENTS

| | | | |
|---|---|---|---|
| 4,941,090 A | 7/1990 | McCarthy | |
| 5,105,184 A | 4/1992 | Pirani et al. | |
| 5,864,823 A | 1/1999 | Levitan | |
| 6,018,768 A * | 1/2000 | Ullman et al. | ................ 709/218 |
| 6,535,509 B2 * | 3/2003 | Amicangioli | ................ 370/389 |
| 6,557,031 B1 * | 4/2003 | Mimura et al. | ............... 709/218 |
| 6,837,436 B2 | 1/2005 | Swartz et al. | |
| 7,022,047 B2 | 4/2006 | Cohen et al. | |
| 7,025,674 B2 | 4/2006 | Adams et al. | |
| 7,266,835 B2 * | 9/2007 | Halbert | ........................... 725/60 |
| 7,367,042 B1 * | 4/2008 | Dakss et al. | .................... 725/60 |
| 2004/0078814 A1 * | 4/2004 | Allen | ............................. 725/47 |
| 2005/0086690 A1 * | 4/2005 | Gilfix et al. | .................... 725/42 |
| 2006/0053077 A1 | 3/2006 | Mourad et al. | |

* cited by examiner

*Primary Examiner* — Benjamin R Bruckart
*Assistant Examiner* — Jason Thomas
(74) *Attorney, Agent, or Firm* — Jackson Walker L.L.P.

(57) ABSTRACT

An embodiment of a system and method wherein a streaming ticker information relating to a video content is integrated with the video content and transmitted to a customer device over a communication network.

18 Claims, 6 Drawing Sheets

USER-CONFIGURABLE VIDEO DATA SERVICE AND INTERFACE

BACKGROUND OF THE DISCLOSURE

1. Field of the Disclosure

The present disclosure relates in general to the field of interactively provisioning video and selected information services through a communication link and providing.

2. Description of the Related Art

The ability to purchase products or services, or obtain commercial information services via television or other display devices is often limited to television shopping networks which direct customers to the phone or the internet to complete a transaction. Many companies strategically place products in television shows and movies but the ability receive selected types of information or to purchase an item related to displayed information is delayed until the consumer chooses to 'shop' for the item.

Television advertisements can be intrusive to viewers. This is exemplified by the market adoption of "TiVo" like devices which allow users to bypass viewing the commercials. Viewers bypassing advertising means that advertising resources are used ineffectively.

Thus, there is a need for information delivery systems that are less intrusive to viewer experience and provide for interactivity for viewing and/or purchasing of vendible items.

BRIEF DESCRIPTION OF THE FIGURES

For detailed understanding of the present disclosure, references should be made to the following detailed description of an exemplary embodiment, taken in conjunction with the accompanying drawings.

DETAILED DESCRIPTION OF THE DISCLOSURE

In view of the above, the present disclosure through one or more of its various aspects and/or embodiments is presented to provide one or more advantages, such as those noted below. The present disclosure provides for obtaining and using user-selected information services and optionally pursuing further related information for purchasing products or services.

In one aspect, a computer readable medium accessible to a processor for executing instructions contained in a computer program embedded in the computer readable medium is provided. The computer program includes an instruction to receive an input for a video program, an instruction to receive an input from a streaming ticker information database related to a content of the video program and an instruction to integrate the input from a streaming ticker information database with the related video program.

Integration in one aspect is the combining of supplemental information that is related to an underlying video program. In another aspect the computer program may include an instruction to receive an input from a customer segmentation database. In still another aspect, the computer program includes an instruction to send the integrated ticker information with the related video program over a network. The computer program may also have an instruction to receive an input for integrating smart tags with the video program. Additionally, a computer program embodiment may include an instruction for providing supplementary information related to the streaming ticker information over the network, wherein the supplementary information is supplied in response to a user initiated request received over the network. In an additional aspect, the computer program has an instruction to receive an input related to an information request from an end-user set-top-box (STB), and yet another aspect has an instruction to receive specific STB customer related information. User specific information includes customer name, address and other billing information.

In another aspect, the disclosure provides an embodiment of a system for vending products is related to streaming ticker information displayed with a video program. The embodiment, in one aspect, includes a product information database comprising information for a vendible product. The embodiment also includes a user-to-processor interface for selecting, on a user display device, the vendible product, and for enabling the user to request vending options for the vendible product. The embodiment also has a processor configured to initiate a display, on the user display device, options related to the selected vendible product.

In a related embodiment the system includes a communication network interface linking the processor and the product information database. In yet another embodiment, the streaming ticker information is integrated with the video program data. Yet, another embodiment includes locating the object information database with a service provider central office. In one aspect, a smart tag may be temporally associated with the video program. In another aspect, vendible product vending options are displayed in a sub-window of a user's video display. In still another aspect, an interactive menu of options for vending objects may be accessed in association with the user display device.

In one exemplary embodiment a computer readable medium containing instructions that when executed by a computer performs a computerized method for integrating streaming ticker information with a video program. This embodiment includes obtaining video program content, obtaining streaming ticker information associated with (the subject matter of) the video program content, and integrating the streaming ticker information with the video program content.

Another embodiment of the computerized method includes displaying the streaming ticker information with the video program. Yet another embodiment includes linking a video display with a product information database of vendible products related to the streaming ticker information. An aspect of the computerized method includes integrating a smart tag with the video program content. In still another embodiment, the computerized method includes displaying vending options for the product information database vendible products. Another aspect includes an interactive menu displayed on a user display device with information related to vendible products in the product information database.

Information content providers, such as entertainment and broadcast companies control the content, delivery and format of streaming ticker information or other information that is available to customers who access video programming provided by a video-service provider. This information is typically not customized by the video-service provider or the customer; hence it provides no opportunity for personalization and no opportunity for selecting or highlighting particular services.

In one aspect an embodiment contributes to increased information available to users while providing value added services and products. The increased information may optionally be related directly to an underlying video or information stream provisioned to a customer through one or more service providers or user subscriptions to information services. An underlying video program is, for example, original programming content separate from supplemental information that may be supplied contemporaneously with the program, and the contemporaneously supplied supplemental information may be related to the program content. Examples of supplemental information include streaming ticker information related generally to information services. Supplemental information may also be information embedded with underlying program content (e.g. 'smart tags') or information supplied from a separate source that is related to the underlying video program. Additionally, services or products related to the underlying video program content or the supplemental information may be ordered in association with the display of the video and/or information content. Additional services available through access to supplemental information may include the option to pay for services or products.

Figure 1:
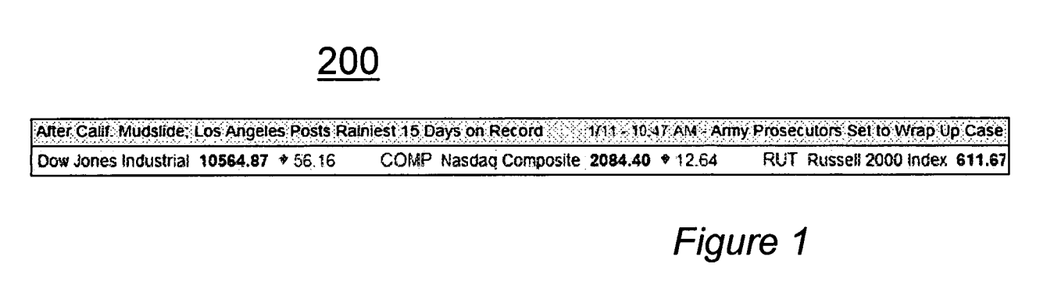
FIG. 1 illustrates a configuration of an embodiment provided for Streaming Ticker for News and Financial Information.

In another aspect a customizable interface may be used to manipulate the information provided, and whether the information is related to an underlying video program content. FIG. 1 is an example of a Streaming Ticker 200 for News and Financial Information. One embodiment includes a user-configurable video data information acquisition service and interface for customer selectable personalized streaming ticker information from information service providers. For example, users may select particular stock quotes, particular categories of stock information or particular types of news items or services from particular vendors. The data information services include a variety of streaming ticker information from providers, which may be manipulated by the user, either by accessing an interface via a television or an Internet web page, and selecting desired information products and services. For example, a customer may select only News from the AP wire and financial information for the NASDAQ. The customer selects this content, and other related content, via an interactive interface and saves the selection to a user profile. The user profile may be used to customize ticker and streaming information content.

In another aspect the interactive interface also allows the user to personalize content for different programming categories, which may be related to an underlying video or information data stream. For instance, News and Financial ticker information may be appropriate when viewing news or financial programs. However, different ticker or other streaming information may be selected when other programming categories are viewed (e.g., home improvement). The interactive interface allows the user to select and customize ticker information for these different programming categories by associating chosen services and products with other selected services and products.

Personalizing streaming ticker information benefits information-service and video-service providers and their customers. In addition, service provider revenue may be generated by including information or services that customers value and will pay to access (e.g., downloading financial reports or other business intelligence). Customer satisfaction is increased by giving customers the ability to manipulate and customize their video and services content.

Figure 2:
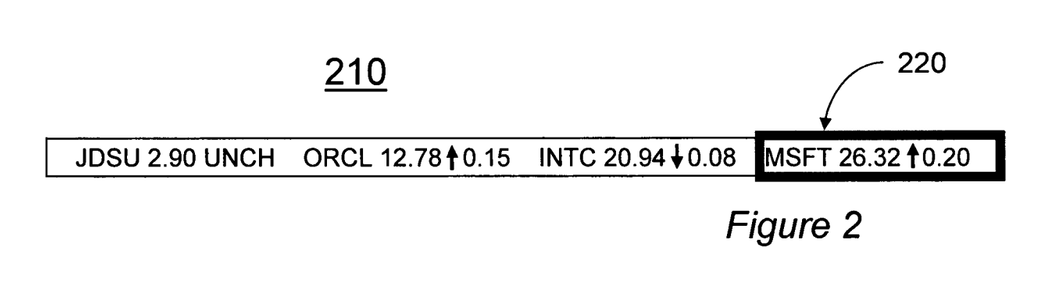
FIG. 2 illustrates a configuration of an embodiment provided for Streaming Ticker information with a selected item highlighted.
Figure 3:
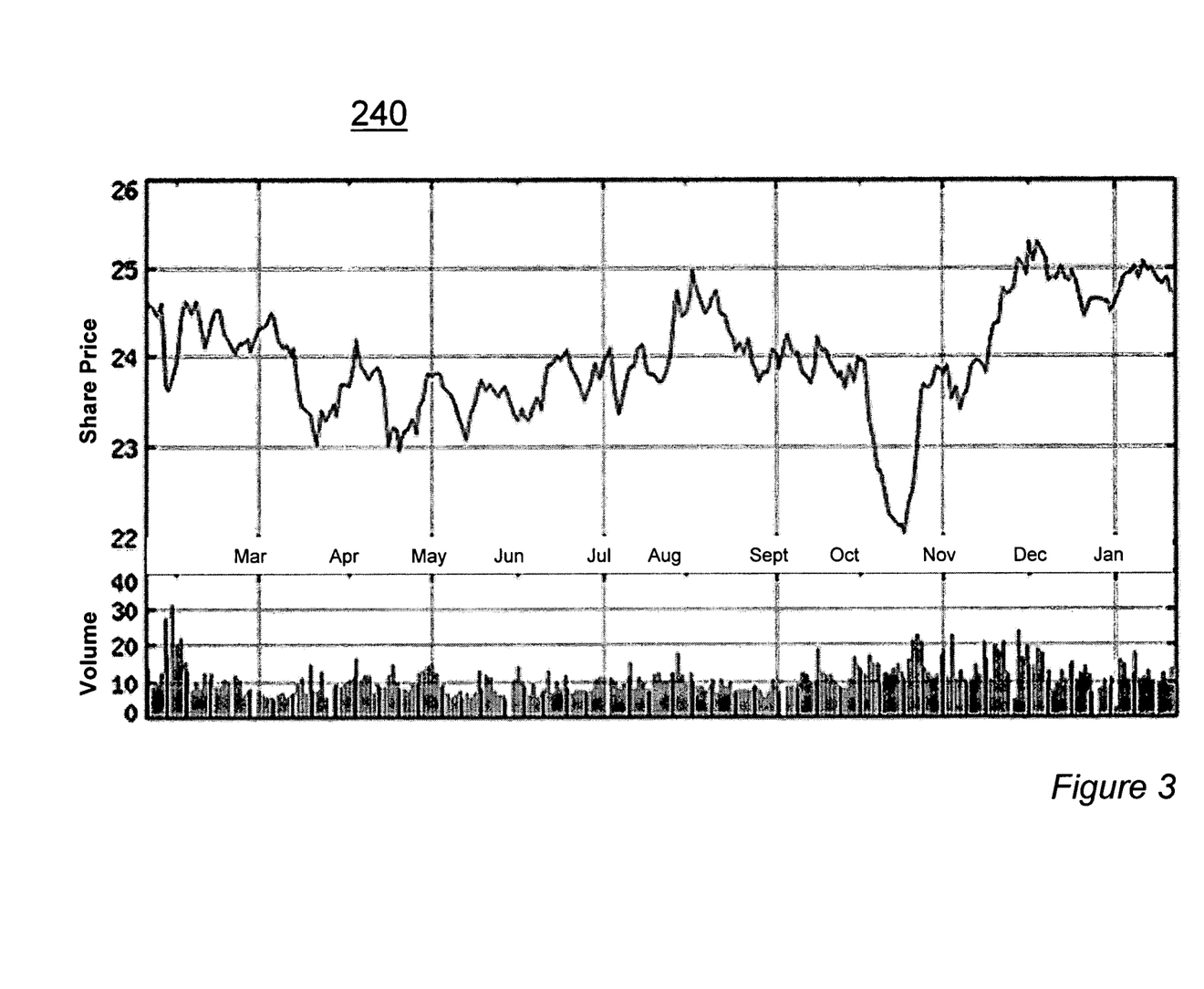
FIG. 3 illustrates a configuration of an embodiment provided for a graph of a stock share price over time in relation to trading volume.

One embodiment provides the user with the ability to control and manipulate the ticker in real-time via a television or other display device interface. For example, if a user profile includes the display of specific financial information, such as stock quotes, then the user utilizes a remote control device or a keyboard to highlight a specific stock on the ticker and get more detailed information (e.g., news, insider trading, etc). The graphical highlight 220 around the "MSFF 26.32↑0.2" quote information stream 210 of FIG. 2 indicates that it has been selected and highlighted by the user. The user uses an input or selection device such as a television remote control to highlight and/or choose a selection and obtain more detailed information display 240 like that shown in FIG. 3. FIG. 3 illustrates a graph of a stock share price over time in relation to trading volume. However, the information related to ticker or other streaming information is selectable so that more or less information may be displayed. All of this information may be displayed contemporaneously with any underlying video programming being viewed by the user.

FIG. 3 illustrates part of an embodiment enabling selecting stock ticker information display 240 related to a highlighted object of interest using a user interface in combination with a display device. While this is a display includes an example of stock (share) price and volume over a particular time period (horizontal axis), the time period (stock price history) for display to the user is selectable, and other categories of information are also optionally available, including purchasing options. The information provided may appear in an interactive user customizable 'webpage' format on the display device utilized by the user, for example, television screen, graphic display device or cell phone Wireless Application Protocol (WAP) portal or any other information display device to which information services are provisioned. The Wireless Application Protocol (WAP) is an open, global specification for mobile users with wireless devices to access and interact with information and services. Additional details are optionally available for selected or highlighted items of interest, along with embedded links common to internet browser interfaces. The additional information may be available on the screen or made available through the display device or a related display device.

The options for user information interface customization includes relating the streaming content to the content of what is appearing on the user's video/information display. The streaming content may 'piggyback' on commercials, such that streaming content is related to the commercials or is related to similar and competing products and services, or the streaming content may be news items related to the products or vendors.

The user interface for streaming information selection and customization, which may be in a webpage or browser style format, is responsive to common data input devices like remote control devices and keypad or keyboards. For example a ticker stream may be paused, one or more items selected and highlighted, and the stream or selections formed into a pull-down listing for further selection using keyboard or keypad commands, mouse inputs or arrow buttons on control devices or any of these in combination. A ticker stream may be browsed item by item, or particular selections may be rapidly chosen to obtain further information.

While the possibilities for user customization of the information selection interface are almost endless, the program content or information services provider may have interests that require some controls over what customizations a user may implement. For example some options may be subject to additional charges before being implemented, or additional charges may accrue based on services selected. Optionally, some providers of commercial content may wish to suppress some related streaming content, which may also be subject to additional considerations.

An alternative embodiment includes a system, apparatus and method to allow broadcasters or content providers to insert "smart tags" into the actual packet content of an underlying video program streaming to a user display device. The underlying video program is the original program content separate from any smart tag associated data. Smart tags may carry supplemental information which may be displayed on the user display device. Smart tags enable viewers to learn about products or services that may be associated with objects or subjects in the underlying video program. For example, a beverage vendor may choose to integrate a smart tag into a video stream during the time their beverage appears with the program, and the smart tag alerts the viewer further products or services are available by interacting with the viewer's display system.

Smart tag interaction with display equipment provides alerts and facilitates viewer interactivity with and about available products and services users may acquire as underlying video programs are in progress. Smart tags, smart tag display and user interaction resulting from smart tags are independent of the underlying video content or whether a commercial advertisement is being displayed or not. For example, with the advent of IPTV, it becomes possible to insert these tags into the data stream of the actual content since all of the content will be digital in nature. These tags provide the viewer with opportunities to interact with that content related to the underlying video stream as well as further products and services made available as a result of initiating the contact.

Whether the smart tag is to be displayed on a particular display device may be based on rules present in or otherwise associated with an end-user display device. For example some users or user-groups may request or deny type or classes or products and services. Smart tags may be targeted to particular users or user groups, and filters may be set to cause initiation or suppression of smart tag enabled display equipment.

Smart tags may be optionally used for interaction with the user information selection interface so that smart tag information is displayed, or alternatively, the smart tags indicate the option of obtaining additional information over network resources, or information which may be imbedded within a video or information source already present or being provisioned from a service or information provider. While the user information selection interface may be customized to use smart tags, user interfaces are modifiable with or without smart tags.

Figure 4:
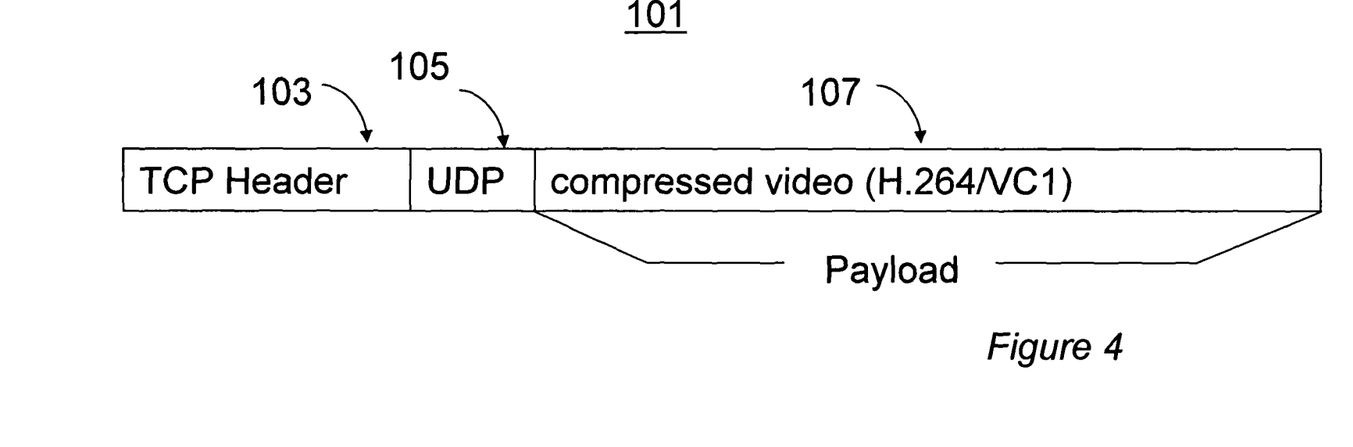
FIG. 4 illustrates a configuration of an embodiment provided for a normal packet structure.

FIG. 4 illustrates an exemplary packet structure 101. A header, for example Transmission Control Protocol (TCP) Header 103 is part of the packet along with User Datagram Protocol (UDP) 105 and the compressed data video payload 107 which for example may be compressed video H.264/VC1.

Figure 5:
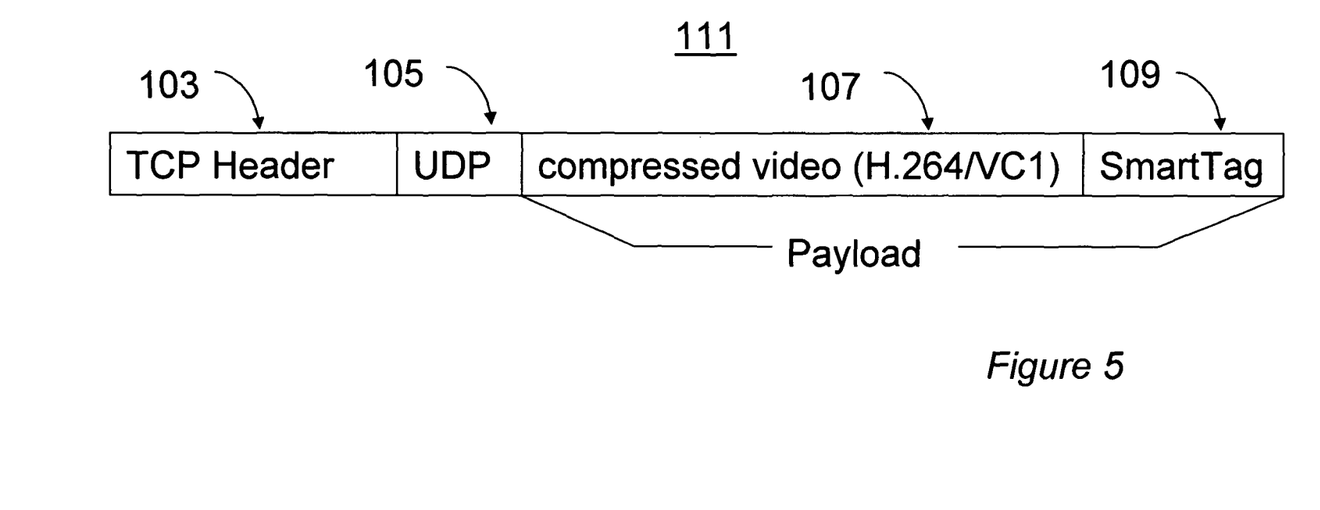
FIG. 5 illustrates a configuration of an embodiment provided for a packet structure with a smart tag inserted with the video.

FIG. 5 illustrates an exemplary packet structure 111 with a smart tag 109 inserted with the compressed video content 107. For a single video stream (i.e. movie, show) most of the packets would typically have the normal structure, such as shown in FIG. 4, and a subset of packets would have the Smart Tag 109 embedded. For content copied to a Digital Video Recorder (DVR) or other media, the TCP and UDP headers are stripped off and the data/video payload is written to the storage device in compressed or uncompressed form. For this reason it is helpful to have smart tags to provide ancillary information directly in the video packets.

In one embodiment, Smart Tags may be integrated into the video portion of data packets 101 on a server, which may be termed an 'integration server.' This server may be any server associated with committing the underlying video program to the video portion of data packets for distribution across a network. A server compressing the data and/or integrating smart tags into the video portion of packets may be anywhere along the route of the data from an original video source (for example a video production studio) through any distribution channel (like an Internet Service Provider). A server may integrate the smart tag with either compressed or decompressed video data. The video data are decompressed at a STB and the smart tags extracted for display or interaction with associated data.

Figure 6:
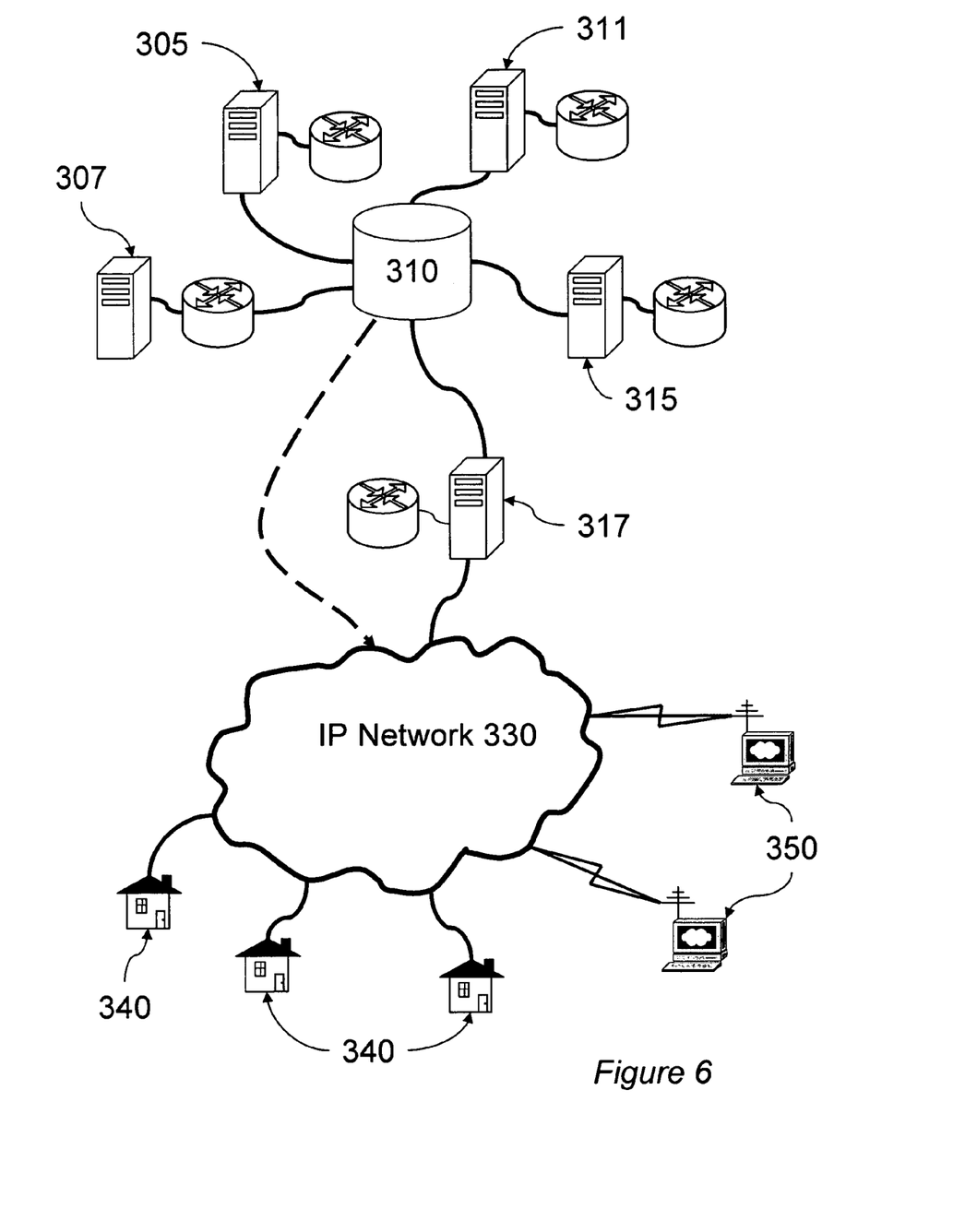
FIG. 6 illustrates a configuration of an embodiment provided for components and network relationships involved in delivering personalized data information services to an end-user.

FIG. 6 is a high-level depiction of certain components and network relationships involved in delivering personalized data information services to an end-user according to one embodiment of the present disclosure. Any of the system components may communicate with other components through a network hub 310. A video content data store 305 server and database pair includes original video programming content. The system has various routers (not shown) to facilitate communications throughout the network(s). Service Provider streaming ticker information data servers (315) with databases are available to provide timely streamed information across IP Network 330 by routing data through or around integration server 317. The streaming ticker information data servers are associated with a product information database comprising information for vendible products that may also may be related to streaming ticker information displayed contemporaneously with a video program. Users of the streaming ticker information may initiate requests for further information through display devices, and optionally purchase products (goods and services) associated with the product information database.

A tag creation suite may be associated with a Tag Server and Database pair 311. Smart Tags may be created using a custom software suite which may contain a provider interface to create the tag content associated with a Tag Database and to integrate the tags into the correct locations of the video portions of the data packet stream. The video with smart tag content may be fed into an Integration Server 317 to integrate content and combine data streams through to the IP network to the end user's Customer Premises Equipment (CPE) location 340 or set top box (424 in FIG. 7) or subscriber wireless portal 350.

Customer information may reside with a Customer Segmentation Server and Database pair 307. This Database 307 may facilitate filtering information accompanying the smart tags for customer targeting of products and services.

An Integration Server with optional database 317 may integrate programs, streaming content, or smart tags 109 into video portions of the data packets 101 so that the data packets are smart tag integrated data packets 111. After data are integrated the data packets may be routed over an IP Network 330 to be provided to end users' locations 340 or 350. While a network path from hub 310 to Integration Server 317 and then with IP Network 330 is illustrated in FIG. 5, it will be appreciated that network access from the hub 310 to the IP Network 330 may be direct and bypass the integration server 317, as illustrated by the dashed line connecting 310 with 330.

In an alternative embodiment the integration of the underlying program may occur at or near a customer's location 340 or wireless device 350.

Figure 7:
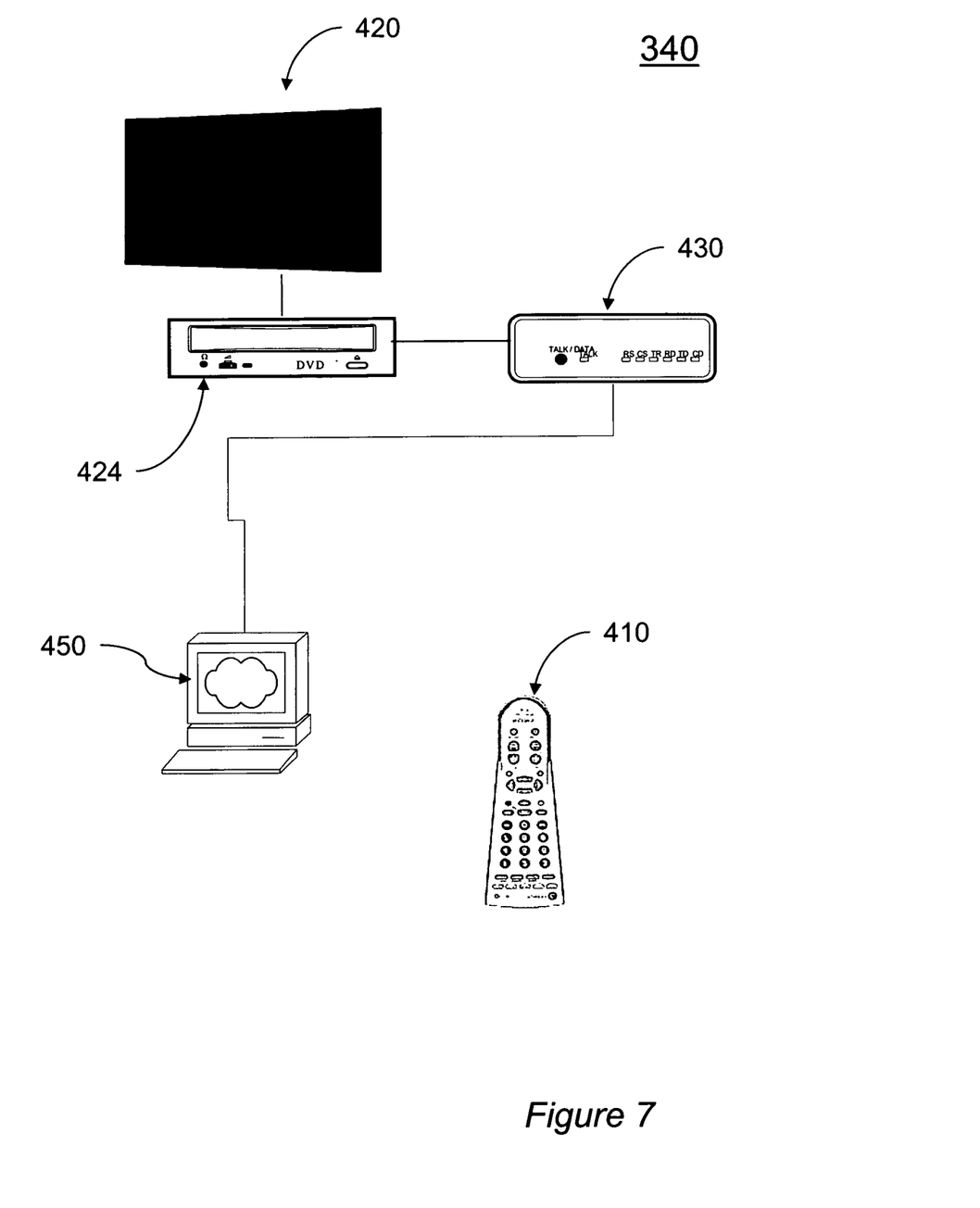
FIG. 7 illustrates a configuration of an embodiment provided for an end user environment.

FIG. 7 further illustrates the end user environment 340. The same or similar features and functions of 340 may be replicated with further wireless access from CPE 350. After the receipt of packet data 111 from the IP Network 330 the data may go through a gateway 450 and then to a router 430. A STB 424 checks the data packets 111 for the presence of smart tags 109 and then provides a display signifying the presence of a smart tag on a display device 420. A remote control 410 or other system interaction device may be used to respond to the presence of information services options and be available to respond to further interaction by a user. While the remote control is one implementation of a 'smart' device that will interact and receive information associated with a Smart Tag, a keyboard or other input device may be used to respond to the presentation of further options to users to obtain information and services.

Product placement within video programming content is an effective method for advertisers to reach consumers. The presence of coordinated and contemporaneous streaming ticker information content and smart tags associated with the products that may be placed with video programming allows a broadcaster to add interactivity to these product placements by allowing for direct consumer interaction with information sources regarding these products. The combining of the streaming information or smart tags with a related video is termed integration. Integration may occur at a service provider's facilities, an end use STB, or anywhere in between.

In one embodiment, a product placement for clothing or automobiles may be included in a popular prime time television show. A data information stream or smart tag related to these products may be integrated with the program containing product placement. An end-user system with a user interface recognizes the presence of the integrated information and that further information and options are available to the user. By interacting with the display equipment in response to being alerted by the information presented in a display, the viewer/user may request further information or engage in direct product purchasing.

The user may be notified on screen that there is more information concerning the product placement, and they could do any number of actions through the remote and the set top box including but not limited to the following: 1) Obtain more information about a promotion/product or streamed item. 2) Order products based on information related to the presented item. 3) Compare the information with other similar data. 4) Bookmark a product/offer for viewing at a later time.

In one embodiment the user request initiates a browser that provides further direct interactivity choices such as ordering information so that the user may directly purchase, for example, clothing worn by a person in the underlying video program, or stocks based on information streamed into the user's display. In another embodiment selected information may be integrated with video programs where the selected information is related to the underlying content of the video program. For example, streaming news and other items may be integrated to enhance marketing during how-to or home improvement programs. The integration may occur on a service provider side of the network interface (e.g. 317) or the integration may occur within CPE like 424 in FIG. 7.

In one embodiment a user's response to information presented within or during a video stream, may lead to a viewer obtaining more information or initiating purchasing actions. For example, a viewer responding to displayed information or a streamed item may include initiation of an information request going out to a Central Office data store (e.g., 305, 307, 311 or 315) or other online data base to bring more information or content to the viewer/requester.

Interaction by a viewer responding to information presented may initiate graphical changes on the display device. These graphical changes may be the further display of graphical information displaying selectable options which in turn can drive other activity. For example, a separate window within a user's display may appear that contains a web browser or other interaction facility for obtaining further product information or initiating ordering. Optionally, the underlying video program may be halted while products or services are ordered using a browser type facility, and then the program may be resumed.

In one aspect, much of the viewer's personal and other information that is repetitiously entered during product ordering need not be entered as such information may be stored in a database corresponding to the user's CPE or other identifier. Such information may be entered once or sent automatically upon receiving an input from the user.

User response to information that may be displayed in conjunction with an underlying video data stream may lead to accessing further information over the network 330. The request for further information goes non-exclusively to at least one of: i) a smart tag, ii) a database associated with the video source (305), iii) an online (internet) database associated with 305, 307, 311 or 315. The rules and optional settings for an STB or other display associated device to interact with streamed and integrated data resides at least in part with software and/or firmware in the STB.

A program or subroutine resident in association with a display facility like an STB that 'sees' integrated data associated with video packets may have several aspects. In one aspect the underlying video data may be received with the streamed data associated contemporaneously or the smart tag associated by direct integration into the video portion of the packet. The associated data may then be 'de-integrated' by a STB to extract the associated information for display. Some of the data may be retained on site to facilitate further interactivity with data stored in conjunction with the video source or with other data available to be accessed over an outside network.

Figure 8:
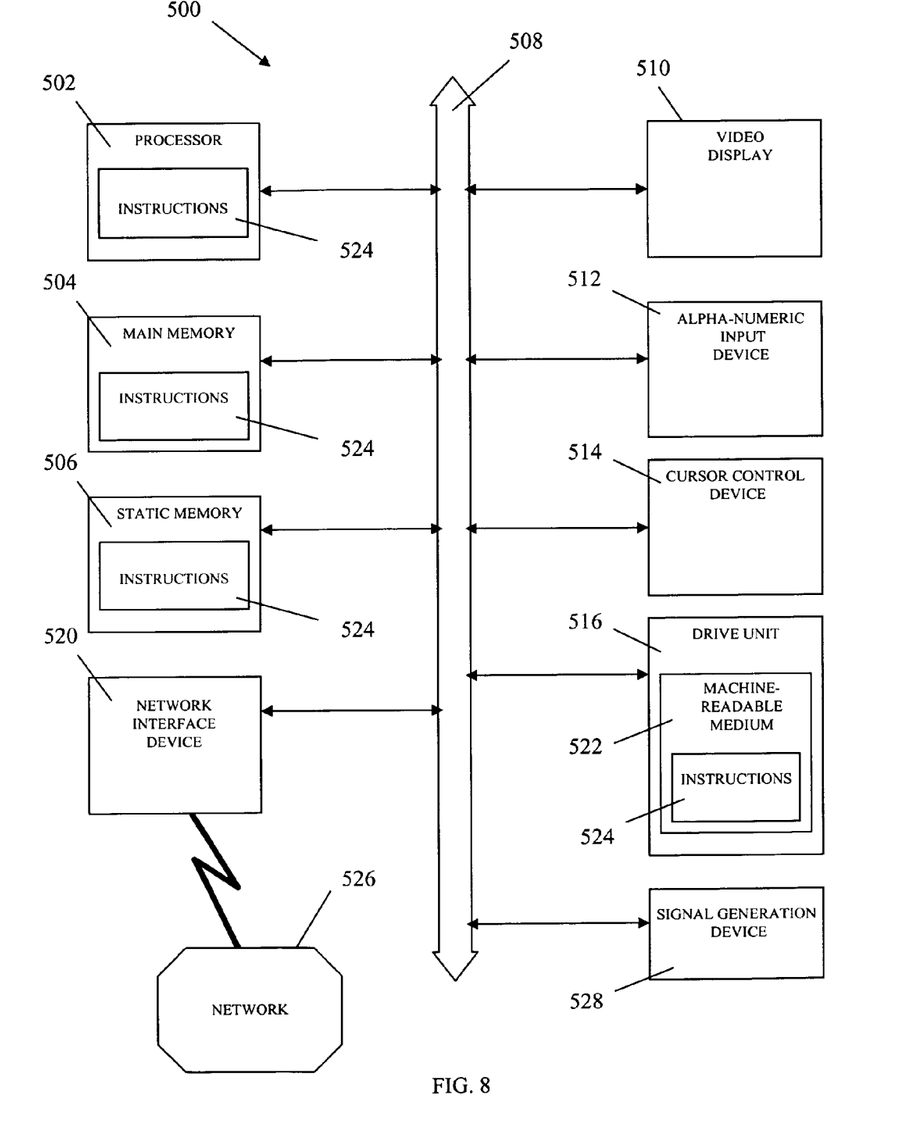
FIG. 8 is a diagrammatic representation of a machine in the form of a computer system within which a set of instructions, when executed, may cause the machine to perform any one or more of the methodologies of the illustrative embodiment.

FIG. 8 is a diagrammatic representation of a machine in the form of a computer system 500 within which a set of instructions, when executed, may cause the machine to perform any one or more of the methodologies discussed herein, including providing video content integrated with streaming ticker information and interactivity to obtain information and order products and services. In some embodiments, the machine operates as a standalone device. In some embodiments, the machine may be connected (e.g., using a network, for example including and not limited to hub 310 and IP Network 330) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a landline telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 524, or that which receives and executes instructions 524 from a propagated signal so that a device connected to a network environment 330 can send or receive voice, video or data, and to communicate over the network 330 using the instructions 524. The instructions 524 may further be transmitted or received over a network 330 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; or magneto-optical or optical medium such as a disk or tape. Accordingly, the illustrative embodiment is considered to include any one or more of a machine-readable medium as listed herein and including art-recognized equivalents, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single disclosure or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the disclosure is not intended to be limited to the particulars disclosed; rather, the disclosure extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

What is claimed is:

1. A non-transitory computer readable medium comprising program instructions, executable by a processor, the program instructions, when executed by the processor, causing the processor to perform operations comprising:
    receiving first user input identifying a video program;
    receiving second user input identifying customized streaming ticker information;
    filtering information included in a received streaming ticker based on the customized streaming ticker information to generate a customized streaming ticker; and
    generating a customized program including the customized streaming ticker and the video program wherein the customized program includes:
        first-type packets comprising a majority of the customized program, wherein the first-type packets include a user datagram protocol header and a payload corresponding to the user datagram protocol, wherein the payload includes compressed video; and
        second-type packets comprising a minority of the customized program, wherein the second-type packets include a transmission control protocol header encapsulating a user datagram protocol header and a corresponding payload, wherein the corresponding payload includes compressed video and a smart tag associated with a product, wherein the second-type packets occur in a portion of the video program in which the product appears; and
    responsive to receiving third user input indicating a particular item on the customized streaming ticker, providing detailed information regarding the particular item.

2. The computer readable medium of claim 1, wherein the smart tag includes product information regarding the product.

3. The computer readable medium of claim 2, wherein the operations include:
    sending the customized program over a network to a customer device.

4. The computer readable medium of claim 3, wherein the operations include:
    pausing the customized streaming ticker in response to user input.

5. The computer readable medium of claim 1, wherein the operations include:
    displaying product information in response to user interaction with a smart tag.

6. The computer readable memory medium of claim 1, wherein the received streaming ticker includes updates for news stories and for stock prices and wherein the second user input identifies subsets of the news stories and the stock prices.

7. A server including:
    a processor; and
    non-transitory computer readable medium accessible to the processor, the computer readable medium comprising program instructions that, when executed by the processor, cause the processor to perform operations including:
    receiving first user input identifying a video program;
    receiving second user input identifying customized streaming ticker information;
    filtering content in a received streaming ticker based on the customized streaming ticker information to generate a customized streaming ticker; and
    generating a customized program including the customized streaming ticker and the video program wherein the customized program includes:
        first-type packets comprising a majority of the customized program, wherein the first-type packets include a user datagram protocol header and a payload corresponding to the user datagram protocol header, wherein the payload includes compressed video; and
        second-type packets comprising a minority of the customized program, wherein the second-type packets include a transmission control protocol header encapsulating a user datagram protocol header and a corresponding payload, wherein the corresponding payload includes compressed video and a smart tag associated with a product, wherein the second type packets occur in a portion of the video program in which the product appears; and
    responsive to receiving third user input identifying a particular item on the customized streaming ticker, providing detailed information regarding the particular item.

8. The server of claim 7, wherein the smart tag includes product information regarding the product.

9. The server of claim 8, wherein the operations include:
    sending the customized program over a network to a customer device.

10. The server of claim 9, wherein the wherein the operations include:
    pausing the customized streaming ticker in response to user input.

11. The server of claim 7, wherein the operations include:
    displaying product information in response to user interaction with a smart tag.

12. The server of claim 7, wherein the received streaming ticker includes updates for news stories and for stock prices and wherein the second user input identifies subsets of the news stories and stock prices.

13. A method for customizing content, the method including:
- receiving first user input identifying a video program;
- receiving second user input identifying customized streaming ticker information;
- filtering content in a received streaming ticker based on the customized streaming ticker information to generate a customized streaming ticker; and
- generating a customized program including the customized streaming ticker and the video program wherein the customized program includes:
  - first-type packets comprising a majority of the customized program, wherein the first-type packets include a user datagram protocol header and a payload corresponding to the user datagram protocol header, wherein the payload includes compressed video; and
  - second-type packets comprising a minority of the customized program, wherein the second-type packets include a transmission control protocol header encapsulating a user datagram protocol header and a corresponding payload, wherein the corresponding payload includes compressed video and a smart tag associated with a product, wherein the second type packets occur in a portion of the video program in which the product appears; and
- responsive to receiving third user input selecting a particular item on the customized streaming ticker, providing detailed information regarding the particular item.

14. The method of claim 13, wherein the smart tag includes product information regarding the product.

15. The method of claim 14, further comprising:
- sending the customized program over a network to a customer device.

16. The method of claim 15, further comprising:
- pausing the customized streaming ticker in response to user input.

17. The method of claim 13, further comprising:
- displaying product information in response to user interaction with a smart tag.

18. The method of claim 13, wherein the received streaming ticker includes updates for news stories and for stock prices and wherein the second user input identifies subsets of the news stories and stock prices.

* * * * *